US012587077B2

(12) United States Patent
Hwang et al.

(10) Patent No.: US 12,587,077 B2
(45) Date of Patent: Mar. 24, 2026

(54) MOTOR AND CLEANER COMPRISING THE SAME

(71) Applicant: SAMSUNG ELECTRONICS CO., LTD., Suwon-si (KR)

(72) Inventors: Woong Hwang, Suwon-si (KR); Wonsoo Kang, Suwon-si (KR); Jimin Kim, Suwon-si (KR); Taesang Park, Suwon-si (KR); Sangmo Shin, Suwon-si (KR); Jinwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 18/216,063

(22) Filed: Jun. 29, 2023

(65) Prior Publication Data

US 2023/0344325 A1     Oct. 26, 2023

Related U.S. Application Data

(63) Continuation of application No. PCT/KR2022/001812, filed on Feb. 7, 2022.

(30) Foreign Application Priority Data

Mar. 30, 2021     (KR) ........................ 10-2021-0041308

(51) Int. Cl.
    H02K 21/02        (2006.01)
    A47L 5/28         (2006.01)
    (Continued)

(52) U.S. Cl.
    CPC .............. H02K 21/024 (2013.01); A47L 5/28 (2013.01); F16C 19/16 (2013.01); H02K 5/1732 (2013.01); H02K 7/083 (2013.01); F16C 2380/26 (2013.01)

(58) Field of Classification Search
    CPC .... H02K 21/024; H02K 5/1732; H02K 7/083; F16C 19/16; F16C 2380/26; A47L 5/28
    See application file for complete search history.

(56) References Cited

U.S. PATENT DOCUMENTS

| | | | |
|---|---|---|---|
| 7,834,501 | B2 | 11/2010 | Childe et al. |
| 11,626,772 | B2 | 4/2023 | Kim et al. |

(Continued)

FOREIGN PATENT DOCUMENTS

| | | |
|---|---|---|
| CN | 210686378 U | 6/2020 |
| JP | 5-11763 | 2/1993 |

(Continued)

OTHER PUBLICATIONS

International Search Report dated May 23, 2022 in International Patent Application No. PCT/KR2022/001812.

(Continued)

*Primary Examiner* — Terrance L Kenerly

(74) *Attorney, Agent, or Firm* — STAAS & HALSEY LLP

(57)     ABSTRACT

A motor and a cleaner comprising the same. The motor comprises a stator including a stator core; a rotating shaft arrangeable inside the stator; a rotor rotatable about the rotating shaft by electromagnetically interacting with the stator while the rotating shaft is arranged inside the stator; a housing to accommodate the stator and the rotor; and a bearing coupleable to the housing such that while the bearing is coupled to the housing, the bearing allows the stator and the rotor to be stably coupled to each other. While the stator and the rotor are accommodated in the housing, a center of the stator core and a center of the rotor along an extension direction of the rotating shaft is arranged at different positions from each other with respect to the extension direction of the rotating shaft.

14 Claims, 11 Drawing Sheets

(51) Int. Cl.
   *F16C 19/16*          (2006.01)
   *H02K 5/173*          (2006.01)
   *H02K 7/08*           (2006.01)

(56)                References Cited

U.S. PATENT DOCUMENTS

| | | | |
|---|---|---|---|
| 2010/0196174 A1* | 8/2010 | Lee ....................... | F04D 25/082 |
| | | | 310/156.53 |
| 2012/0255582 A1 | 10/2012 | Bennett et al. | |
| 2018/0242799 A1 | 8/2018 | Hayamitsu | |

FOREIGN PATENT DOCUMENTS

| | | |
|---|---|---|
| JP | 2007-198216 | 8/2007 |
| JP | 6382122 | 8/2018 |
| JP | 2019-138250 | 8/2019 |
| KR | 20-2000-0019975 | 11/2000 |
| KR | 10-0474344 | 3/2005 |
| KR | 10-2009-0029439 | 3/2009 |
| KR | 10-2010-0118448 | 11/2010 |
| KR | 10-2018-0065621 | 6/2018 |
| KR | 10-2019-0016739 | 2/2019 |
| KR | 10-2158532 | 9/2020 |
| KR | 10-2022-0109838 | 8/2022 |

OTHER PUBLICATIONS

Korean Office Action dated Jul. 18, 2025 for Korean Application No. 10-2021-0041308.

* cited by examiner

MOTOR AND CLEANER COMPRISING THE SAME

CROSS-REFERENCE TO RELATED APPLICATION

This application is a continuation application, under 35 U.S.C. § 111(a), of international application No. PCT/KR2022/001812, filed on Feb. 7, 2022, which claims priority under 35 U. S. C. § 119 to Korean Patent Application No. 10-2021-0041308, filed Mar. 30, 2021, the disclosures of which are incorporated herein by reference in their entireties.

BACKGROUND

Field

The present disclosure relates to a motor and a cleaner including the same, and more particularly, to a cleaner including a motor having improved durability.

Description of Related Art

In general, a motor is a machine that obtains a rotational force from electrical energy, and includes a stator and a rotor. The rotor is configured to interact electromagnetically with the stator and configured to be rotated by a force acting between a magnetic field and a current flowing in a coil.

The motor may include the stator, the rotor configured to be rotated, a housing accommodating the stator and the rotor, and a bearing configured to stably rotate the rotor by combining the stator and the rotor at an accurate position.

The motor may be used in a variety of cleaners. For example, the motor may be disposed in a main body of the cleaner to generate power.

The bearing is a configuration for minimizing a frictional force of the rotor and a support structure that may be generated by a rotational force of the rotor, and the bearing may include an inner ring and an outer ring, and an intermediate body arranged between the inner ring and the outer ring.

There is a clearance between the intermediate body and the outer ring and between the intermediate body and the inner ring, and a bearing noise may occur due to the clearance during rotation of the rotor.

SUMMARY

One aspect of the present disclosure provides a motor including a stator including a stator core, a rotating shaft arrangeable inside the stator, a rotor rotatable about the rotating shaft by electromagnetically interacting with the stator while the rotating shaft is arranged inside the stator, a housing to accommodate the stator and the rotor, and a bearing coupleable to the housing such that while the bearing is coupled to the housing, the bearing allows the stator and the rotor to be stably coupled to each other. While the stator and the rotor are accommodated in the housing, a center of the stator core and a center of the rotor along an extension direction of the rotating shaft to be arranged at different positions from each other with respect to the extension direction of the rotating shaft.

The motor may further include an impeller, coupleable to the rotating shaft at an upper side of the housing, to generate a flow of air. The center of the stator core along the extension direction of the rotating shaft may be arranged closer to the impeller than the center of the rotor with respect to the extension direction of the rotating shaft.

The motor may further include an impeller, coupleable to the rotating shaft at an upper side of the housing, to generate a flow of air. The center of the stator core along the extension direction of the rotating shaft may be arranged further from the impeller than the center of the rotor with respect to the extension direction of the rotating shaft.

The rotor may be provided with a permanent magnet.

While the rotor is accommodated in the housing, the rotor may be moveable by a predetermined distance toward a direction of the impeller that is coupled to the rotating shaft, by a magnetic interaction with the stator.

The bearing may include an inner ring coupleable to the rotating shaft, an outer ring coupleable to the housing, and a ball arrangeable between the inner ring and the outer ring while the inner ring is coupled to the rotating shaft and the outer ring is coupled to the housing. The inner ring of the bearing may interlock with a movement of the rotor so as to be moveable by a predetermined distance toward the direction of the impeller.

The rotor may be moved toward the direction of the impeller, the center of the stator core and the center of the rotor along the extension direction of the rotating shaft are arranged at a same position as each other with respect to the extension direction of the rotating shaft.

The rotor may be moved more than the predetermined distance toward the direction of the impeller a flow of air by the impeller in response to the motor being driven.

While the rotor is accommodated in the housing, the rotor may be moveable by a predetermined distance toward a direction opposite to the direction of the impeller that is coupled to the rotating shaft, by a predetermined distance by a magnetic interaction with the stator.

The bearing may include an inner ring coupleable to the rotating shaft, an outer ring coupleable to the housing, and a ball arrangeable between the inner ring and the outer ring while the inner ring is coupled to the rotating shaft and the outer ring is coupled to the housing. The inner ring of the bearing may interlock with a movement of the rotor so as to be moveable by a predetermined distance toward the direction opposite to the direction of the impeller.

The rotor may be moved by a predetermined distance toward the direction opposite to the direction of the impeller, the center of the stator core and the center of the rotor along the extension direction of the rotating shaft are arranged at a same position as each other with respect to the extension direction of the rotating shaft.

The rotor may be moved more than the predetermined distance toward the direction, of the impeller, by a flow of air by the impeller in response to the motor being driven, so as to allow the center of the stator core along the extension direction of the rotating shaft to be closer to the impeller than the center of the rotor with respect to the extension direction of the rotating shaft.

Another aspect of the present disclosure provides a motor including a stator including a stator core, a rotating shaft arrangeable inside the stator, a rotor rotatable about the rotating shaft by electromagnetically interacting with the stator, a housing to accommodate the stator and the rotor, a frame formed of metal and coupleable to an inside of the housing so as to come into contact with the stator core, and a bearing coupleable to the frame such that while the bearing is coupled to the frame, the bearing allows the stator and the rotor to be stably coupled to each other. Where the stator and the rotor are coupleable to the frame and while coupled, a center of the rotor and a center of the stator core along an extension direction of the rotating shaft are arranged at different positions from each other with respect to the extension direction of the rotating shaft.

The bearing and the frame may be among a plurality of frames and a plurality of bearings and the plurality of frames may include an upper frame disposed on an upper side of the stator core and a lower frame disposed on a lower side of the stator core, and the plurality of bearings may include a first bearing coupleable to the upper frame and a second bearing coupleable to the lower frame.

The first bearing and the second bearing, respectively, may include an inner ring coupleable to the rotating shaft, an outer ring coupleable to the upper frame and the lower frame, respectively, and a ball arrangeable between the inner ring and the outer ring while the inner ring is coupled to the rotating shaft and the outer ring is coupled to the housing. The inner ring may interlock with a movement of the rotor so as to be moveable by a predetermined distance toward a vertical direction.

The motor may further include an impeller, coupleable to the rotating shaft, at an upper side of the housing to generate a flow of air. The center of the stator core along the extension direction of the rotating shaft may be arranged closer to the impeller than the center of the rotor with respect to the extension direction of the rotating shaft.

The motor may further include an impeller, coupleable to the rotating shaft, at an upper side of the housing to generate a flow of air. The center of the stator core along the extension direction of the rotating shaft may be arranged further from the impeller than the center of the rotor with respect to the extension direction of the rotating shaft.

Another aspect of the present disclosure provides a cleaner including a main body, a suction head configured to suction foreign substances on a surface to be cleaned into the main body, and a motor arrangeable inside the main body to generate a suction force. The motor includes a stator including a stator core, a rotating shaft arrangeable inside the stator, a rotor rotatable about the rotating shaft by electromagnetically interacting with the stator, a housing to accommodate the stator and the rotor, and a bearing coupleable to the housing to allow the stator and the rotor to be stably coupled to each other. While the stator and the rotor are accommodated in the housing to allow a center of the stator core and a center of the rotor along an extension direction of the rotating shaft to be arranged at different positions from each other with respect to the extension direction of the rotating shaft.

The cleaner may further include an impeller coupleable to the rotating shaft at an upper side of the housing to generate a flow of air. The center of the stator core along the extension direction of the rotating shaft may be arranged closer to the impeller than the center of the rotor with respect to the extension direction of the rotating shaft.

The cleaner may further include an impeller coupleable to the rotating shaft at an upper side of the housing to generate a flow of air. The center of the stator core along the extension direction of the rotating shaft may be arranged further from the impeller than the center of the rotor with respect to the extension direction of the rotating shaft.

BRIEF DESCRIPTION OF THE DRAWINGS

These and/or other aspects of the disclosure will become apparent and more readily appreciated from the following description of embodiments, taken in conjunction with the accompanying drawings of which:

4

Figure 1:
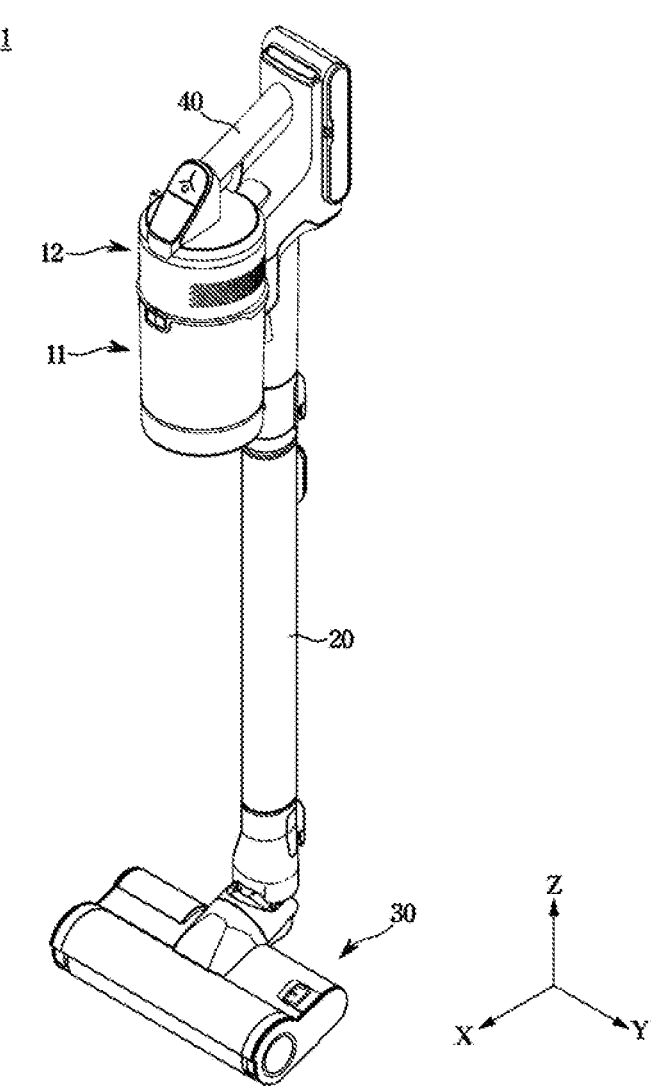

FIG. 1 is a view of a cleaner including a motor according to one embodiment of the present disclosure.

Figure 2:
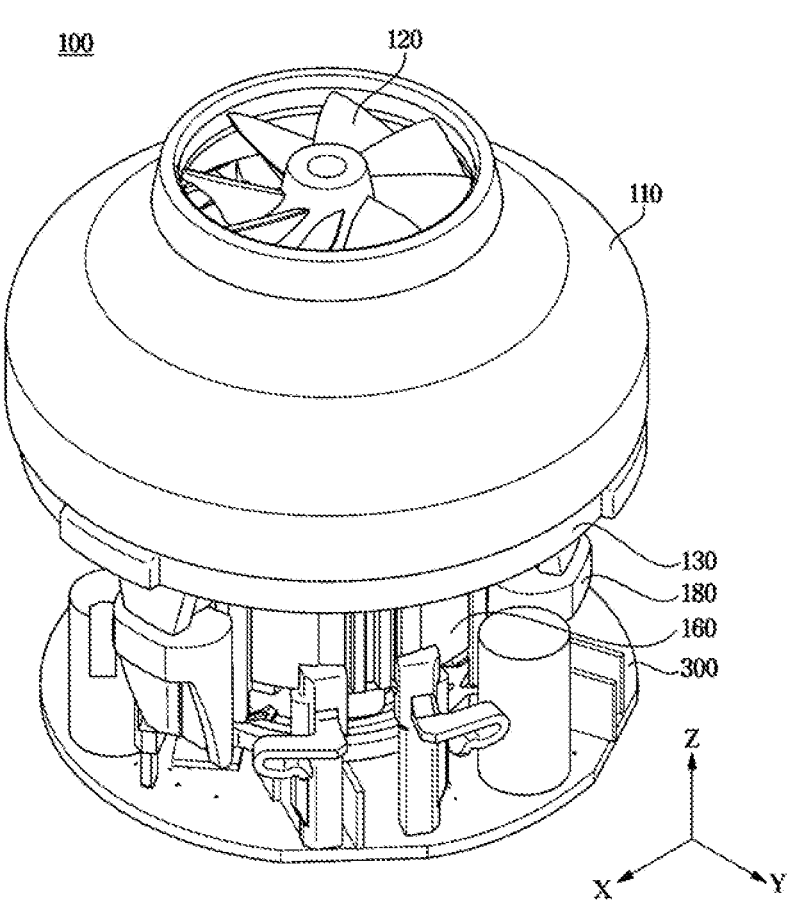

FIG. 2 is a perspective view of the motor according to one embodiment of the present disclosure.

Figure 3:
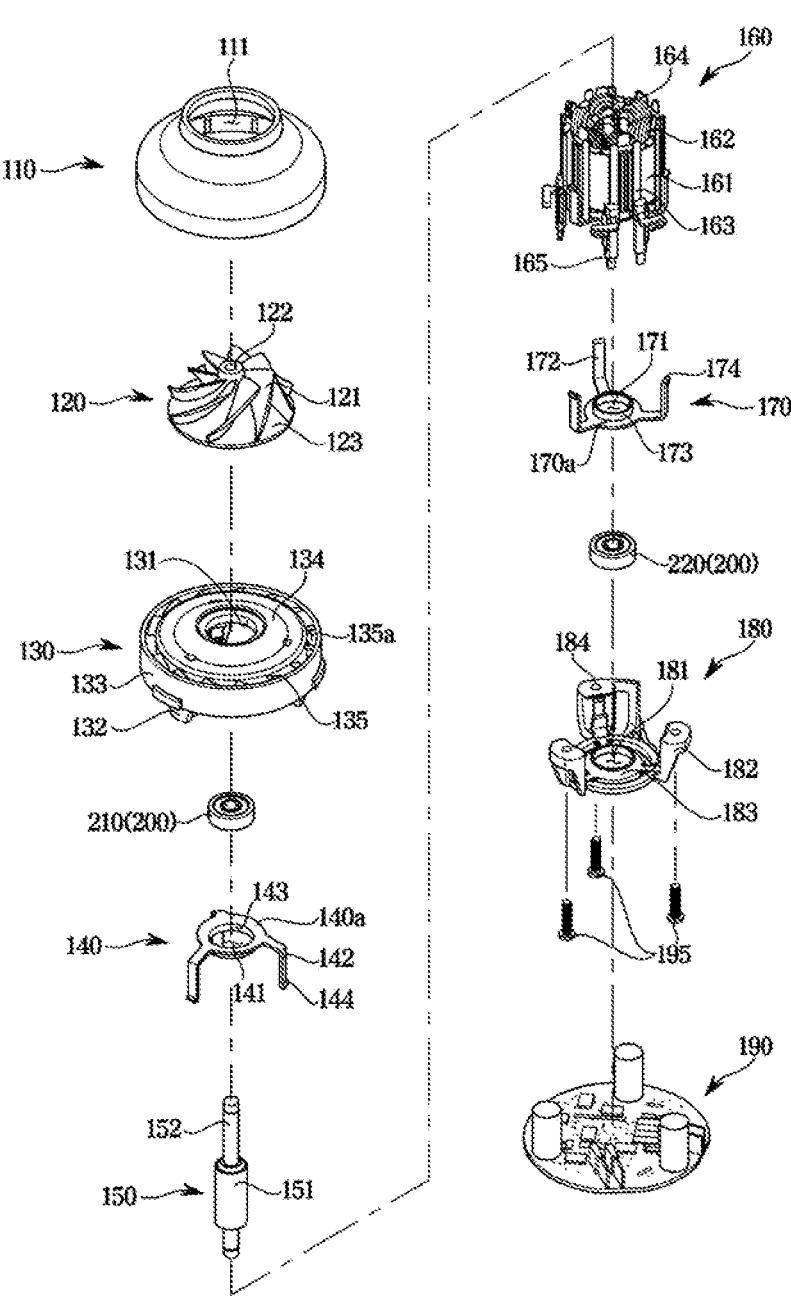

FIG. 3 is an exploded perspective view of the motor according to one embodiment of the present disclosure.

Figure 4:
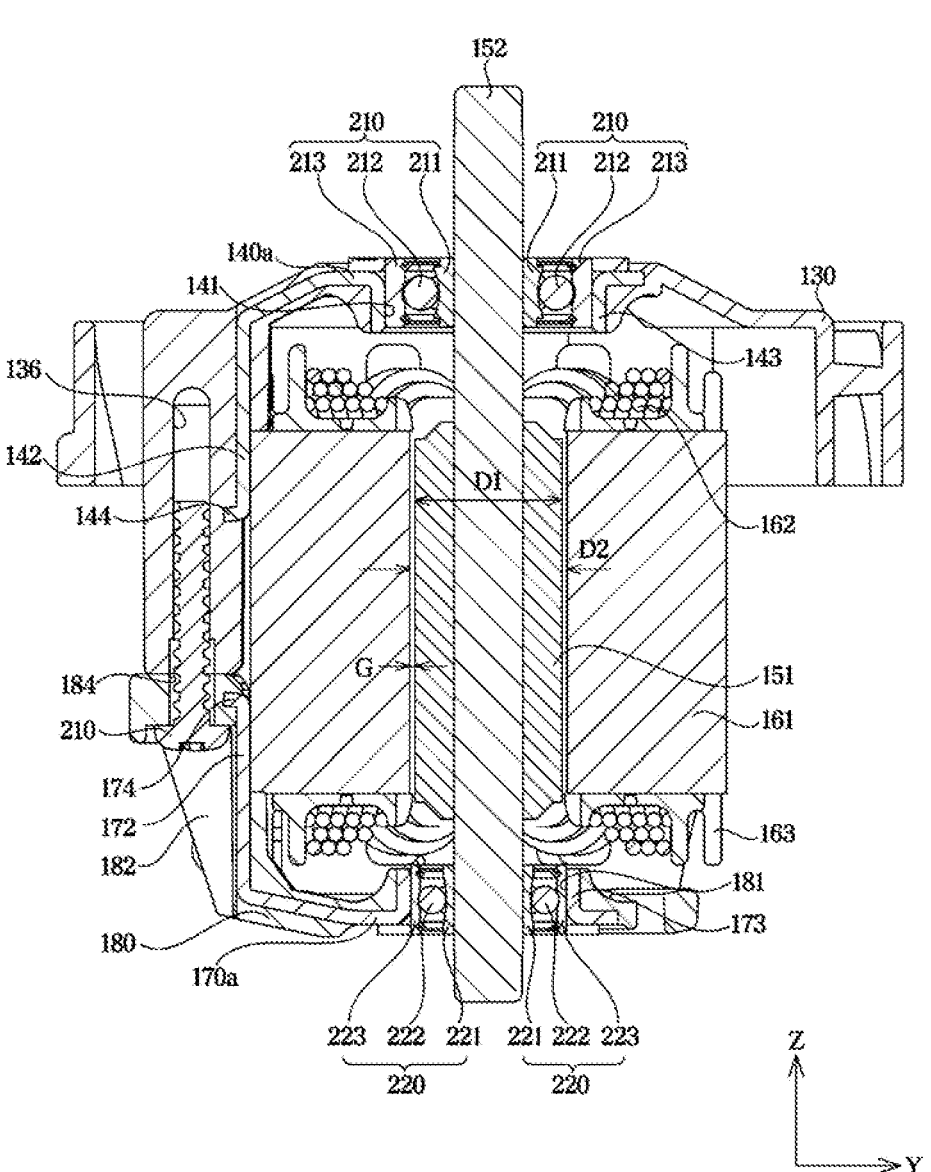

FIG. 4 is a cross-sectional view of some components of the motor according to one embodiment of the present disclosure.

Figure 5:
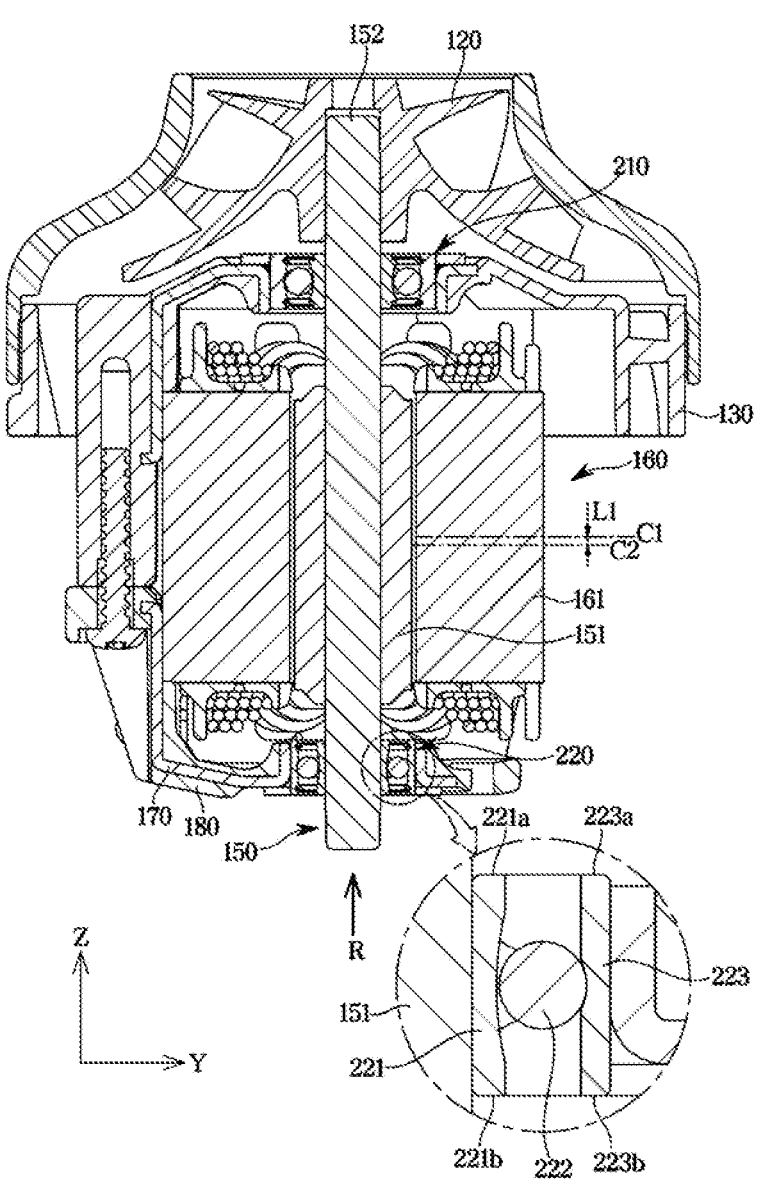

FIG. 5 is a cross-sectional view illustrating a state in which some components of the motor according to one embodiment of the present disclosure are assembled.

Figure 6:
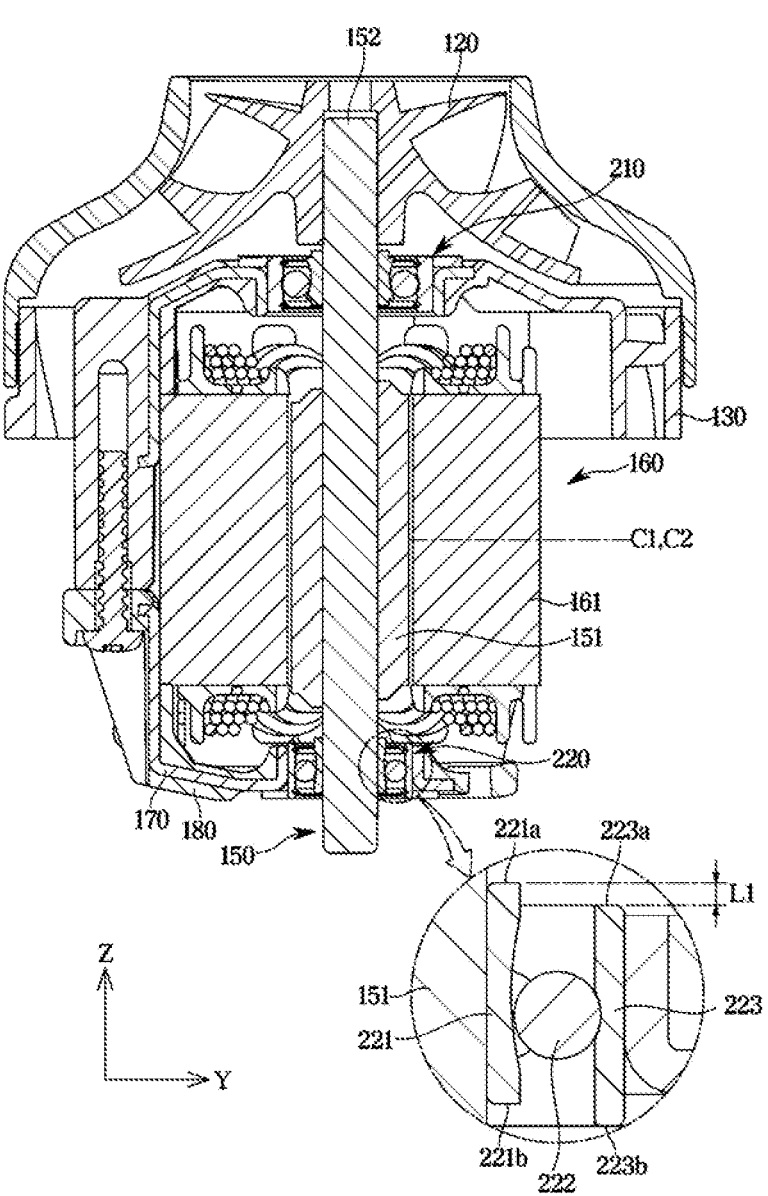

FIG. 6 is a cross-sectional view illustrating a state after some components of the motor according to one embodiment of the present disclosure are assembled.

Figure 7:
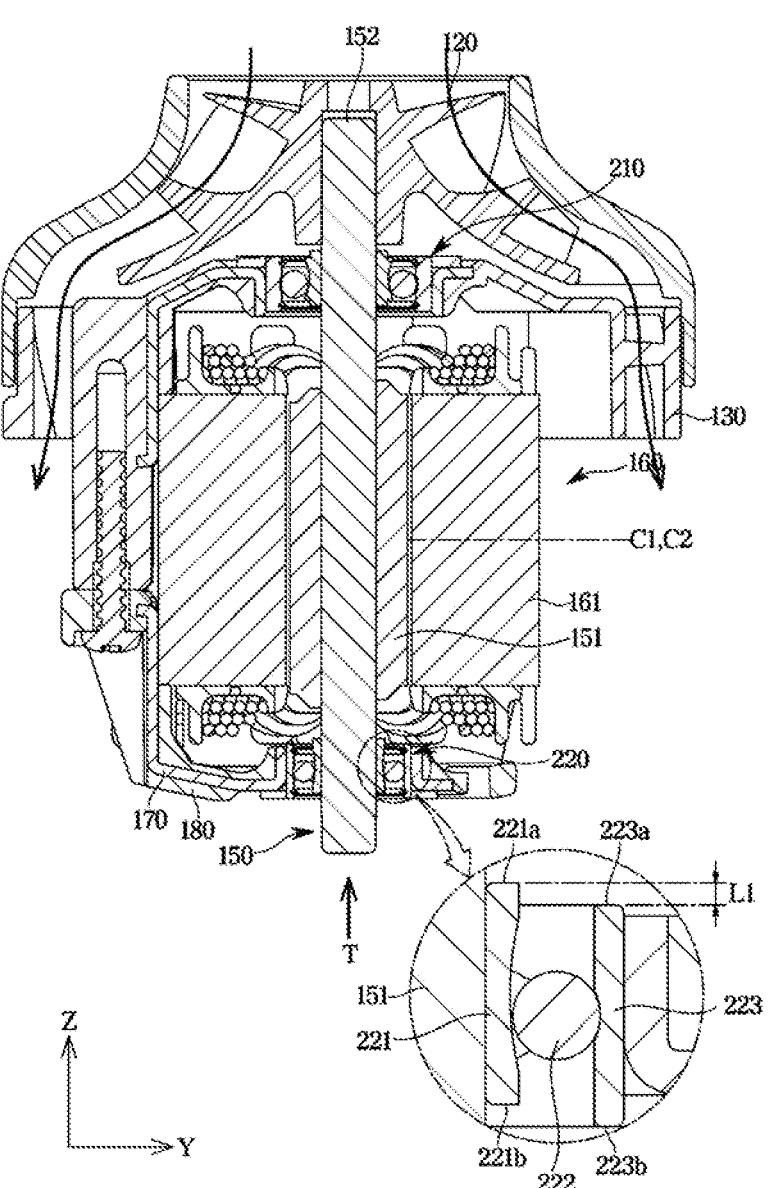

FIG. 7 is a cross-sectional view of some components of the motor according to one embodiment of the present disclosure when the motor is driven.

Figure 8:
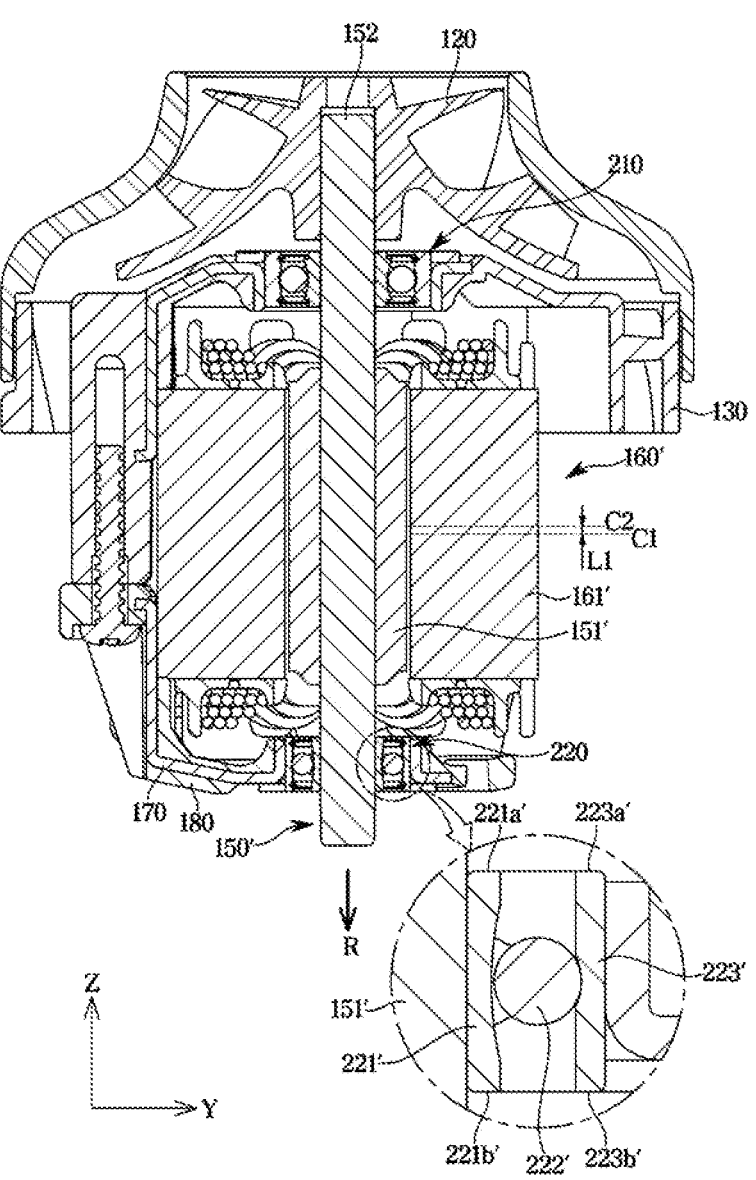

FIG. 8 is a cross-sectional view illustrating a state in which some components of a motor according to another embodiment of the present disclosure are assembled.

Figure 9:
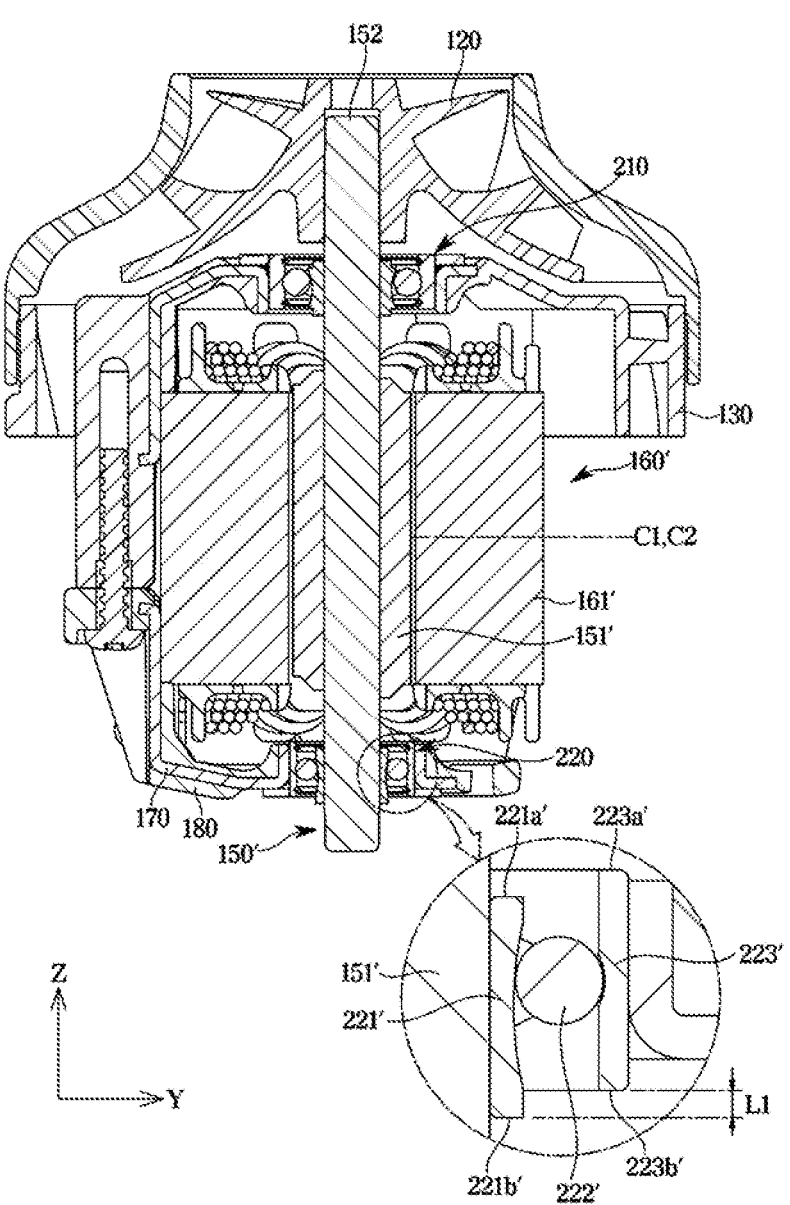

FIG. 9 is a cross-sectional view illustrating a state after some components of the motor according to another embodiment of the present disclosure are assembled.

Figure 10:
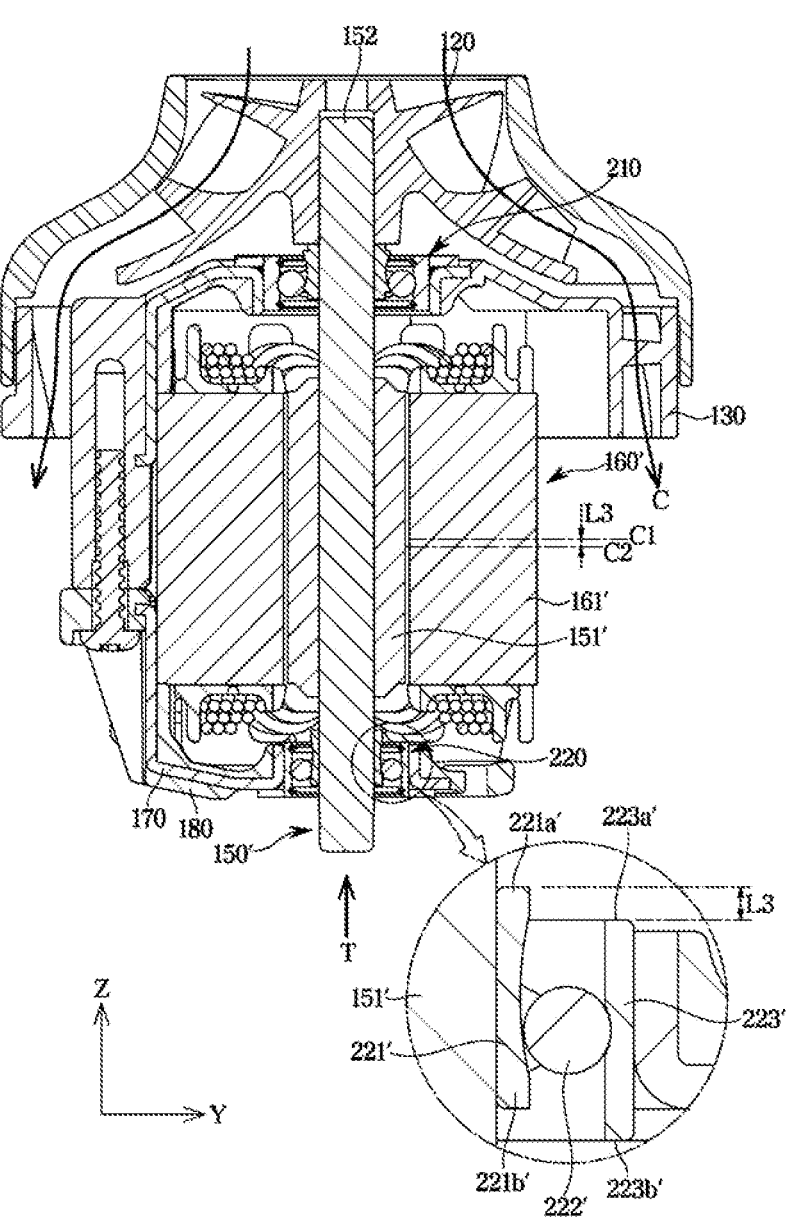

FIG. 10 is a cross-sectional view of some components of the motor according to another embodiment of the present disclosure when the motor is driven.

Figure 11:
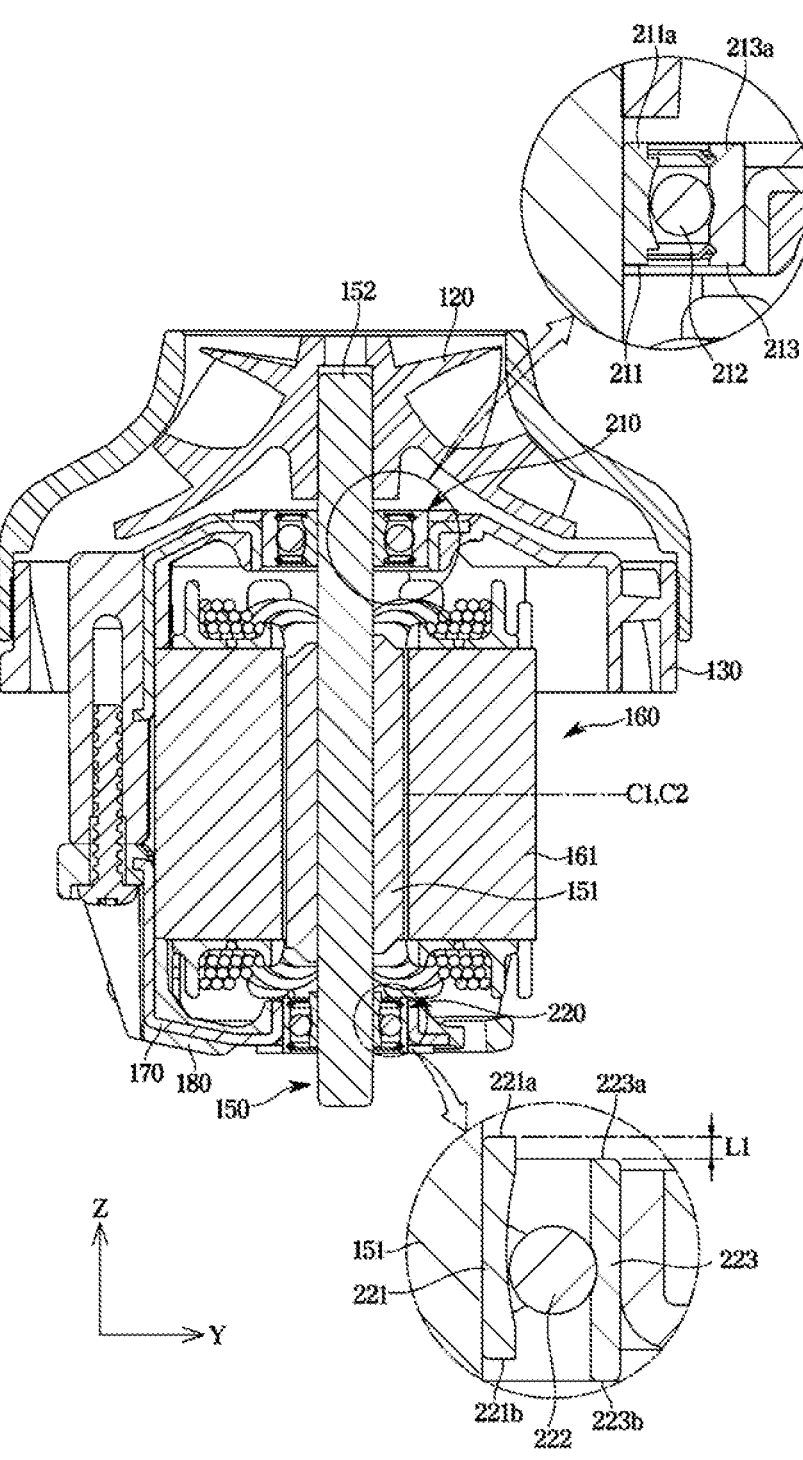

FIG. 11 is a cross-sectional view illustrating a state after some components of a motor according to another embodiment of the present disclosure are assembled.

DETAILED DESCRIPTION

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function. Shapes and sizes of elements in the drawings may be exaggerated for clear description.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front side", "rear side", "left side", "right side", and the like may be defined by the drawings, but the shape and the location of the component is not limited by the term.

In addition, according to various embodiments of the present disclosure, it may be used in various home appliances including cleaners, but hereinafter a cleaner will be described.

The present disclosure is directed to providing a motor capable of improving durability and reducing a noise, and a cleaner including the same.

Without a configuration in which a preload is applied to a bearing to reduce noise generated from the bearing, a motor and a cleaner may reduce the noise while improving durability of the bearing, by applying a predetermined preload to the bearing through a restoring force generated by a magnetic force between a rotor and a stator.

The disclosure will be described more fully hereinafter with reference to the accompanying drawings.

FIG. 1 is a view of a cleaner including a motor according to one embodiment of the present disclosure.

Referring to FIG. 1, a cleaner 1 according to one of embodiments of the present disclosure may include a motor 100. There is no limitation in the type of cleaner 1. For example, the motor 100 may be used in a stick type cleaner or an upright type cleaner.

In addition, the motor 100 may be applied to various home appliances other than cleaners. Hereinafter the stick type cleaner 1 including the motor 100 will be mainly described.

The cleaner 1 may include a cleaner main body 10 and a suction head 30. The cleaner 1 may include a pipe 20 connecting the cleaner main body 10 and the suction head 30, and a handle 40 connected to the cleaner main body 10.

The handle 40 may be a part coupled to the cleaner main body 10, and may be provided to be held by a user and to allow the user to operate the cleaner 1. A manipulator (not shown) may be provided on the handle 40 to allow a user to operate the cleaner 1.

The suction head 30 may be under the cleaner main body 10 and may be disposed to come into contact with a surface to be cleaned. The suction head 30 may come into contact with the surface to be cleaned and configured to move dust or dirt from the surface to be cleaned into the cleaning main body 10 with a suction force generated from the motor 100.

The cleaner main body 10 may include a dust collector 11 and a driving device 12 provided therein. The dust collector 11 may be provided to collect dust or dirt of the surface to be cleaned that is sucked from the suction head 30.

The driving device 12 may include the motor 100 configured to drive the cleaner 1. The motor 100 may generate power to generate a suction force inside the cleaner main body 10.

FIG. 2 is a perspective view of the motor according to one embodiment of the present disclosure. FIG. 3 is an exploded perspective view of the motor according to one embodiment of the present disclosure. FIG. 4 is a cross-sectional view of some components of the motor according to one embodiment of the present disclosure.

Referring to FIGS. 2 to 4, the motor 100 may include a stator 160, a rotor assembly 150, housings 130 and 180, an impeller 120 coupled to a rotating shaft 152 of the rotor assembly 150 so as to generate a flow of air, a cover 110 provided to cover the impeller 120 and provided to guide air suctioned by the impeller 120, a controller 190 configured to control the motor, and a bearing 200 coupled to the housings 130 and 180 to allow the rotor 151 to be stably coupled thereto.

The cover 110 may be provided to cover the impeller 120. In addition, the cover 110 may include a guide member (not shown) provided to guide the air sucked by the impeller 120. The cover 110 may be provided to be coupled to an upper housing 130. The cover 110 may include an opening 111 provided to allow air to be sucked into the impeller 120.

The motor 100 may include the impeller 120 coupled to the rotating shaft 152 to generate a flow of air.

The impeller 120 may include a shaft coupler 122 to which the rotating shaft 152 is coupled. When the rotating shaft 152 is coupled to the shaft coupler 122, the impeller 120 may rotate together with the rotating shaft 152.

The impeller 120 may include a hub 123 and a plurality of blades 121 protruding from the hub 123 to form a flow of air.

The hub 123 may be provided in such a way that a cross-sectional area thereof becomes smaller in an axial direction of the rotating shaft 152, and as the impeller 120 rotates, the air introduced in the axial direction may be discharged in a radial direction of the rotating shaft 152. For example, the impeller may be provided in such a way that the cross-sectional area thereof becomes smaller in a Z-direction.

The plurality of blades 121 may be provided on the hub 123 to be rotated together with the hub 123 to form a flow of air. The plurality of blades 121 may be provided on an outer surface of the hub 123.

A first bearing 210 may be arranged on an inner side of the hub 123, and the plurality of blades 121 may be arranged on the outer surface of the hub 123 to form a flow of air.

The housings 130 and 180 may be provided to accommodate the stator 160 and the rotor assembly 150. The housings 130 and 180 may be formed by injection molding. Therefore, because the housings 130 and 180 use an injection-molded material, the housings 130 and 180 may have a relatively light weight compared to a housing formed of metal. The housings 130 and 180 may include the upper housing 130 and a lower housing 180. The upper housing 130 may be a first housing 130 and the lower housing 180 may be a second housing 180.

The upper housing 130 and the lower housing 180 may be coupled to the rotor 151 and the stator 160 interposed therebetween. When the upper housing 130 and the lower housing 180 are coupled, the rotor 151 may be coupled to the stator 160 at a distance.

The upper housing 130 may include an upper frame seating member 131 on which the first bearing 210 is seated. An upper frame 140 may also be coupled to the upper frame seating member 131. For example, a first forming rib 143 may be coupled to the upper frame seating member 131, and the first bearing 210 may be seated in a first seating hole 141 formed by the first forming rib 143.

In addition, the upper housing 130 may include a first coupler 132 extending in the axial direction and coupled to the lower housing 180. The upper housing 130 may be provided in a substantially cylindrical shape, and may include an outer circumferential surface 133 provided to be coupled to the cover 110 and an upper surface 134 provided to cover an upper surface of the stator 160 and the rotor 151.

In addition, the upper housing 130 may include a flow path 135a through which air discharged from the impeller 120 flows, and a diffuser vane 135 provided to guide air flowing through the flow path 135a. The vane 135 may be integrally formed with the upper housing. For example, the vane 135 may be formed by being injected-molded together with the upper housing 130 when the upper housing 130 is injected-molded. Therefore, the productivity may be improved because there is no need to separately produce the diffuser or assemble the diffuser to the upper housing 130.

The first coupler 132 may extend from the outer circumferential surface 133 of the upper housing 130 in the axial direction. The first coupler 132 may be spaced apart along a circumferential direction of the upper housing 130 and may be provided in plurality. For example, three first couplers 132 may be provided. In addition, the number of first couplers 132 is not limited thereto and may be provided in various numbers. The first coupler 132 may be an upper coupler 132.

The lower housing 180 may include a lower frame seating member 181 in which a second bearing 220 is seated. A lower frame 170 may also be coupled to the lower frame seating member 181. For example, a second forming rib 173 may be coupled to the lower frame seating member 181, and the second bearing 220 may be seated in a second seating hole 171 formed by the second forming rib 173.

The lower housing 180 may include a second coupler 182 provided to be coupled to the first coupler 132 of the upper housing. The number of the second couplers 182 may correspond to the number of the first couplers 132. The first coupler 132 and the second coupler 182 may be coupled by various known methods. For example, the first coupler 132 and the second coupler 182 may be coupled by force-fitting. The second coupler 182 may be a lower coupler 182. According to one of embodiments of the present disclosure, the upper housing 130 and the lower housing 180 may be coupled by a fastener 195. For example, the fastener 195 may include a tapping screw 195. Therefore, the upper housing 130 and the lower housing 180 may be coupled without processing a separate tab on the housings 130 and 180, and thus the productivity of the motor may be increased.

The bearing 200 may include the first bearing 210 coupled to an upper side of the rotating shaft 152 and the second bearing 220 coupled to a lower side of the rotating shaft 152. The first bearing 210 may be disposed between the upper housing 130 and the rotating shaft 152 to support the rotating shaft 152 so as to allow the rotating shaft 152 to be rotated while a rotation axis of the rotating shaft 152 is fixed. The second bearing 220 may be disposed between the lower housing 180 and the rotating shaft 152 to support the rotating shaft 152 so as to allow the rotating shaft 152 to be rotated while the rotation axis of the rotating shaft 152 is fixed.

The motor 100 may further include the frames 140 and 170. The frames 140 and 170 may be coupled to the inside of housings 130 and 180 to increase the rigidity of the housings 130 and 180. For example, the frames 140 and 170 may be integrally formed with the housings 130 and 180. In the drawings, it is illustrated that the frames 140 and 170 are separated, for the description. The frames 140 and 170 may be formed of metal. The frames 140 and 170 may be provided in plurality. The plurality of frames 140 and 170 may include the upper frame 140 and the lower frame 170. The upper frame 140 may be a first frame 140, and the lower frame 170 may be a second frame 170. The frames 140 and 170 may be inserted when the housings 130 and 180 are injected-molded. For example, the frames 140 and 170 may be inserted before the housings 130 and 180 are injected-molded, and then the housings 130 and 180 may be injected-molded. Therefore, there is no need to perform a separate assembly process after each production, and the productivity may be increased.

The upper frame 140 may be coupled to the upper housing 130. The upper frame 140 may be integrally formed with the upper housing 130. For example, after inserting the upper frame 140, the upper housing 130 may be injected-molded. The upper frame 140 may include a first base 140*a*, the first seating hole 141, a first contact rib 142, the first forming rib 143, and a first coupling rib 144.

The first seating hole 141 may be formed in the first base 140*a*. The first bearing 210 may be seated in the first seating hole 141. The first seating hole 141 may be provided in a shape corresponding to the first bearing 210. The first seating hole 141 may be formed to correspond to the upper frame seating member 131.

The first contact rib 142 may extend downward from the first base 140*a*. For example, the first contact rib 142 may extend downward from an outer circumferential surface of the first base 140*a*. The first contact rib 142 may be in contact with the outer circumferential surface of a stator core 161 to prevent electric corrosion of the first bearing 210. Details are described below.

The first forming rib 143 may extend downward from the first base 140*a* to form the first seating hole 141. For example, the first forming rib 143 may extend downward to form the first seating hole 141 inside the first base 140*a*.

The first coupling rib 144 may protrude outward from one end of the first contact rib 142. The first coupling rib 144 may be coupled to the upper housing 130. For example, the first coupling rib 144 may be provided in a shape corresponding to the inner surface of the upper housing 130. Accordingly, the upper frame 140 and the upper housing 130 may not be separated.

The lower frame 170 may be coupled to the lower housing 180. The lower frame 170 may be integrally formed with the lower housing 180. For example, after inserting the lower frame 170, the lower housing 180 may be injected-molded. The lower frame 170 may include a second base 170*a*, a second seating hole 171, a second contact rib 172, a second forming rib 173, and a second coupling rib 174.

The second seating hole 171 may be formed in the second base 170*a*. The second bearing 220 may be seated in the second seating hole 171. The second seating hole 171 may be provided in a shape corresponding to the second bearing 220. The second seating hole 171 may be formed to correspond to the lower frame seating member 181.

The second contact rib 172 may extend downward from the second base 170*a*. For example, the second contact rib 172 may extend downward from an outer circumferential surface of the second base 170*a*. The second contact rib 172 may be in contact with an outer circumferential surface of the stator core 161 to prevent electric corrosion of the second bearing 220. Details are described below.

The second forming rib 173 may extend downward from the second base 170*a* to form the second seating hole 171. For example, the second forming rib 173 may extend downward to form the second seating hole 171 inside the second base 170*a*.

The second coupling rib 174 may protrude outward from one end of the second contact rib 172. The second coupling rib 174 may be coupled to the lower housing 180. For example, the second coupling rib 174 may be provided in a shape corresponding to the inner surface of the lower housing 180. Accordingly, the lower frame 170 and the lower housing 180 may not be separated.

The stator 160 may include the stator core 161, a stator coil 162, an insulator 163, and a rotor receiving member 164. The stator 160 may be configured to generate magnetic flux when a current is applied to the stator coil 162.

The rotor receiving member 164 for receiving the rotor 151 may be provided at the center of the stator core 161. The rotor 151 may be disposed in the rotor receiving member 164. The rotor 151 may electromagnetically interact with the stator 160.

The rotor 151 may be provided as a permanent magnet having magnetism or a coil having electromagnetic properties. Accordingly, the rotor 151 may be configured to be rotated by electromagnetically interacting with the stator 160. In one embodiment of the present disclosure, it is assumed that the rotor 151 is provided with a permanent magnet.

The stator coil 162 may be wound around the stator core 161 in a state in which the insulator 163 is coupled to the stator core 161.

The insulator 163 may be formed of a material having electrical insulation. The insulator 163 insulates the stator core 161 and the stator coil 162 by surrounding the stator core 161.

The motor 100 may include an insertion member 165 provided at a lower end of the insulator 163. The insertion member 165 may be provided to be inserted into the controller 190.

The rotor assembly 150 may include the rotating shaft 152. The rotating shaft 152 may be configured to be rotated when the rotor 151 electromagnetically interacts with the stator 160.

The motor 100 may further include the controller 190 configured to control the speed of the motor. The controller 190 may be disposed below the motor, but is not limited thereto. The controller 190 may be disposed in various positions according to the type of cleaner.

The upper frame 140 and the upper housing 130 may be integrally formed. For example, after inserting the upper frame 140, the upper housing 130 may be injected-molded. The upper frame 140 may be formed of metal, and the upper housing 130 may be formed by injection molding.

The first forming rib 143 may be inserted into the upper frame seating member 131. The first forming rib 143 may form the first seating hole 141. The first bearing 210 may be seated in the first seating hole 141. The first coupling rib 144 may be coupled to the inner surface of the upper housing 130. For example, the first coupling rib 144 may be formed to correspond to the upper housing 130.

According to one embodiment of the present disclosure, the upper housing 130 may include a first fastener hole 136. The fastener 195 may be inserted into the first fastener hole 136. The fastener 195 may be inserted to couple the upper housing 130 and the lower housing 180 together. The fastener 195 may be the tapping screw 195. The tapping screw 195 may couple the upper housing 130 and the lower housing 180 while forming a spiral groove in the first fastener hole 136.

The lower frame 170 and the lower housing 180 may be integrally formed with each other. After inserting the lower frame 170, the lower housing 180 may be injected-molded. The lower frame 170 may be formed of metal, and the lower housing 180 may be formed by injection molding.

According to one embodiment of the present disclosure, the second forming rib 173 may be inserted into the lower frame seating member 181. The second forming rib 173 may form the second seating hole 171. The second bearing 220 may be seated in the second seating hole 171. The second coupling rib 174 may be coupled to the inner surface of the lower housing 180. For example, the second coupling rib 174 may be formed to correspond to the lower housing 180.

According to one embodiment of the present disclosure, the lower housing 180 may include a second fastener hole 184. The fastener 195 may be inserted into the second fastener hole 184. The fastener 195 may be the tapping screw 195. The tapping screw 195 may pass through the second fastener hole 184 to couple the upper housing 130 and the lower housing 180.

An inner diameter D2 of the stator core 161 may be greater than an outer diameter D1 of the rotor 151 so as to receive the rotor 151. Further, the inner diameter D2 of the stator core 161 may be greater than or equal to an outer diameter of at least one of the bearings 200. A gap G between the inner diameter D2 of the stator core 161 and the outer diameter D1 of the rotor 151 may be included to allow the stator core 161 and the rotor 151 to interact electromagnetically with each other. The gap G may be less than or equal to 1 mm. However, the size of the gap G is not limited thereto.

According to one of embodiments of the present disclosure, the bearings 200 may be seated in each of the plurality of seating holes 141 and 171, respectively. For example, the first bearing 210 may be seated in the first seating hole 141, and the second bearing 220 may be seated in the second seating hole 171. The bearing 200 may be disposed between the rotating shaft 152 and the forming ribs 143 and 173. For example, the first bearing 210 may be disposed between the rotating shaft 152 and the first forming rib 143, and the second bearing 220 may be disposed between the rotating shaft 152 and the second forming rib 173. Inner rings 211 and 221 of the bearing 200 may be in contact with the rotating shaft 152, and outer rings 213 and 223 of the bearing 200 may be in contact with the forming ribs 143 and 173 of the frame. For example, the inner ring 221 of the first bearing 210 may be in contact with the rotating shaft 152, and the outer ring 213 of the first bearing 210 may be in contact with the first forming rib 143. The inner ring 221 of the second bearing 220 may be in contact with the rotating shaft 152, and the outer ring 223 of the second bearing 220 may be in contact with the second forming rib 173.

According to one of embodiments of the present disclosure, the frames 140 and 170 may be in contact with the stator core 161 and the bearing 200, respectively. The frames 140 and 170 may be in contact with the outer circumferential surface of the stator core 161 and the outer rings 213 and 223 of the bearing 200, respectively. For example, the upper frame 140 may be in contact with the stator core 161 and the outer ring 213 of the first bearing 210. The lower frame 170 may be in contact with the stator core 161 and the outer ring 223 of the second bearing 220.

The bearing 200 may include the inner rings 211 and 221, the outer rings 213 and 223, and balls 212 and 222, respectively.

An adhesive may be applied to couple the bearing 200 and the frames 140 and 170. For example, an adhesive member may be disposed between the bearing 200 and the frames 140 and 170. At least one adhesive member may be disposed between the first bearing 210 and the upper frame 140, and disposed between the second bearing 220 and the lower frame 170.

The first bearing 210 may be provided to have a larger cross-sectional area than the second bearing 220. The impeller 120 may be disposed above the first bearing 210. The first bearing 210 may have a larger cross-sectional area than the second bearing 220 to support a load of the impeller 120. A diameter ratio of the first bearing 210 and the second bearing 220 may be 1.1 to 1.6. However, the diameter ratio is not limited thereto.

In addition, the plurality of seating holes 141 and 171 may have sizes corresponding to the bearings 210 and 220, respectively. Accordingly, the first seating hole 141 may be formed to be larger than the second seating hole 171. For example, the first seating hole 141 may have a larger area than the second seating hole 171. However, it is not limited thereto, and the first and second bearings 210 and 220 may be provided in the same size. In addition, accordingly, the plurality of seating holes 141 and 171 may also be provided in the same size.

Hereinafter a structure for reducing noise generated from the bearing 200 will be described in detail.

FIG. 5 is a cross-sectional view illustrating a state in which some components of the motor according to one embodiment of the present disclosure are assembled, FIG. 6 is a cross-sectional view illustrating a state after some components of the motor according to one embodiment of the present disclosure are assembled, and FIG. 7 is a cross-sectional view of some components of the motor according to one embodiment of the present disclosure when the motor is driven.

As mentioned above, the first and second bearings 210 and 220 may have different diameters, but configurations of the first and second bearings 210 and 220 may be formed and driven in the same manner. Therefore, the second bearing 220 will be described as a reference to avoid duplicate descriptions.

The ball 222 may be disposed between the inner ring 221 and the outer ring 223 of the bearing 220, and a clearance may be formed between the inner ring 221 and the outer ring 223 to improve durability of the bearing 220. A predetermined space, in which the ball 222 is moved, may be formed inside the bearing 220 by the clearance, and accordingly, noise may be generated while the ball 222 is moved.

In addition, the inner ring 221 or the outer ring 223 may also be moved by a predetermined distance due to the clearance. As the outer ring 223 is fixed to the frames 140 and 170 of the motor 100, the inner ring 221 may be provided to be movable a predetermined distance by the clearance. Therefore, as the rotor assembly 150 connected to the inner ring 221 is moved inside the motor 100, noise may be generated.

To prevent this, a washer provided to apply a preload to the bearing 220 may be disposed in the seating hole 171, in which the bearing 220 is seated, in the conventional manner. The washer may be disposed to face the bearing 220 inside the seating hole 171 in a direction in which the rotating shaft 152 extends.

The washer may press the bearing 220 in an extension direction of the rotating shaft 152 to limit the movement of the inner ring 221 and the outer ring 223, thereby reducing noise that may be generated from the bearing 220. Particularly, as the washer presses one end of the bearing 220 in the extension direction of the rotating shaft 152, the inner ring 221 and the outer ring 223 may be moved in the pressing direction, thereby minimizing the clearance inside the bearing 220. Accordingly, the movement of the ball 222 may be minimized.

However, as the washer continuously presses the bearing 220 in the extension direction of the rotating shaft 152, the frictional force between the inner ring 221, the outer ring 223, and the ball 222 increases. Accordingly, the performance of the bearing 220 is reduced, and in the case of a ball bearing type like the present disclosure, a rigidity in the radial direction is high, but a rigidity in the extension direction of the rotating shaft 152 is low. Therefore, when the washer continuously presses the bearing 220 in the extension direction of the rotating shaft 152, the durability of the bearing 220 may deteriorate.

To relieve the difficulty, the motor 100 according to one embodiment of the present disclosure may improve durability of the bearing 220 while reducing noise of the bearing 220 without including a washer.

Particularly, the motor 100 according to one embodiment of the present disclosure may move the inner ring 221 of the bearing 220 by using the magnetic force generated between the stator core 161 and the rotor 151, thereby reducing noise that may be generated in the bearing 220.

A center C1 of the stator core 161 and a center C2 of the rotor 151 may be spaced apart from each other in the extension direction of the rotating shaft 152.

Accordingly, external pressure according to a magnetic restoring force R may be formed in the rotor 151. A preload may be generated in the rotor 151 according to the restoring force R, and a preload pressed in one direction may be generated in the bearing 220 interlocking with the rotor 151. Accordingly, the clearance inside the bearing 220 may be minimized. Therefore, noise generated from the bearing 220 may be reduced.

As illustrated in FIG. 5, the center C1 of the stator core 161 may be disposed closer to the impeller 120 than the center C2 of the rotor 151 with respect to the extension direction of the rotating shaft 152.

The center C1 of the stator core 161 may be defined as a center of the magnet of the stator core 161 in the extension direction of the rotating shaft 152, and may be defined as a magnetic center of the stator core 161 in the extension direction of the rotating shaft 152.

The center C1 of the rotor 151 may be defined as the center of the magnet of the rotor 151 in the extension direction of the rotating shaft 152, and may be defined as a magnetic center of the rotor 151 in the extension direction of the rotating shaft 152.

In FIG. 5 and FIGS. 6 to 11 to be described below, for convenience of description, positions of the center C1 of the stator core 161 and the center C2 of the rotor 151 are illustrated as an extension line extending in a direction perpendicular to the extension direction of the rotating shaft 152.

When a direction from the center C1 of the stator core 161 or the center C2 of the rotor 151 in the extension direction of the rotating shaft 152 to the impeller 120 is defined as a first direction Z, the center C1 of the stator core 161 may be disposed closer to the impeller 120 than the center C2 of the rotor 151 with respect to the first direction Z.

Accordingly, a predetermined gap L1 may be generated between the center C1 of the stator core 161 and the center C2 of the rotor 151. That is, the stator 160 and the rotor assembly 150 may be mounted on the motor 100 to allow the gap L1 to be formed between the center C1 of the stator core 161 and the center C2 of the rotor 151.

When the stator core 161 and the rotor 151 are arranged to allow a predetermined gap L1 to be generated between the center C1 of the stator core 161 and the center C2 of the rotor 151, it is defined that the center C1 of the stator core 161 and the center C2 of the rotor 151 are disposed at a first position.

Further, when the center C1 of the stator core 161 is disposed closer to the impeller 120 than the center C2 of the rotor 151 with respect to the first direction Z, it is defined that the center C1 of the stator core 161 and the center C2 of the rotor 151 are disposed at the first position.

The rotating shaft 152 may be disposed in the motor 100 in such a way that the center C1 of the stator core 161 and the center C2 of the rotor 151 are disposed at the first position so as to allow the gap L1 to be formed between the centers C1 and C2. Accordingly, the inner ring 221 of the bearing 220 may be arranged to be in contact with the rotating shaft 152 that is disposed to allow the gap L1 to be formed between the center C1 of the stator core 161 and the center C2 of the rotor 151.

When the stator 160 and the rotor assembly 150 are assembled to allow the gap L1 to be formed between the center C1 of the stator core 161 and the center C2 of the rotor 151, one end 221a of the inner ring 221 and one end 223a of outer ring 223 of the bearing 220 may be arranged at substantially corresponding heights in a radial direction of the bearing 220.

The one ends 221a and 223a of the inner ring 221 and the outer ring 223 refer to ends, which are adjacent to the impeller 120, in the bearing 220, and the other ends 221b and 223b of the inner ring 221 and the outer ring 223 refer to ends, which are disposed opposite to the impeller 120, in the bearing 220.

Due to a magnetic force formed between the stator core 161 and the rotor 151, the center C1 of the stator core 161 and the center C2 of the rotor 151 may be moved to a position facing each other. That is, the stator core 161 and the rotor 151 may be moved in a direction, in which the centers C1 and C2 are aligned with each other, by the magnetic force formed between the stator core 161 and the rotor 151.

Accordingly, after the stator 160 and the rotor assembly 150 are assembled to the motor 100 to allow the gap L1 to be formed between the center C1 of the stator core 161 and the center C2 of the rotor 151, the rotor 151 may be moved toward the first direction Z by the magnetic force formed between the stator core 161 and the rotor 151.

As described above, the center C1 of the stator core 161 may be disposed closer to the impeller 120 than the center C2 of the rotor 151 with respect to the first direction Z, and by the magnetic force generated at this time, the center C2 of the rotor 151 may be pressed to be moved to a position corresponding to the position of the center C1 of the stator core 161.

Because the stator 160 is fixed to the motor 100, the rotor assembly 150 may be moved to allow the center C1 of the stator core 161 and the center C2 of the rotor 151 to be close to each other. That is, the center C2 of the rotor 151 may be moved in the first direction Z toward the center C1 of the stator core 161.

Because the center C1 of the stator core 161 is disposed closer to the impeller 120 than the center C2 of the rotor 151, the center C2 of the rotor 151 may be moved to the first direction Z corresponding to a direction in which the impeller 120 is disposed.

As the restoring force R is transmitted to the rotor assembly 150 by the magnetic force generated between the stator core 161 and the rotor 151, the rotor 151, the rotating shaft 152, and the inner ring 221 coupled to the rotating shaft 152 may interlock with each other so as to be moved in the direction in which the impeller 120 is disposed.

As illustrated in FIG. 6, the center C2 of the rotor 151 may be moved in the direction, in which the impeller 120 is disposed, by the restoring force R. A state, in which the center C2 of the rotor 151 is moved toward the center C1 of the stator core 161 by the restoring force R, is defined that the center C1 of the stator core 161 and the center C2 of the rotor 151 are disposed at a second position.

Because the restoring force R is generated as soon as the center C1 of the stator core 161 and the center C2 of the rotor 151 are disposed at the first position, the center C1 of the stator core 161 and the center C2 of the rotor 151 may be immediately moved from the first position to the second position. That is, because the center C1 of the stator core 161 is fixed, the center C1 of the stator core 161 may be fixed at one position regardless of the first and second positions. As soon as the center C2 of the rotor 151 is arranged at the first position, the center C2 of the rotor 151 may be moved to the second position. When the rotor assembly 150 is assembled to the motor 100, the center C2 of the rotor 151 may be moved from an assembled position to a direction, in which the impeller 120 is disposed, by the restoring force R.

At the second position, the center C1 of the stator core 161 and the center C2 of the rotor 151 may be aligned with each other and thus the restoring force R may be 0 (zero). However, the fact that the center C1 of the stator core 161 and the center C2 of the rotor 151 are disposed at the second position may mean that the center C1 of the stator core 161 and the center C2 of the rotor 151 are disposed at a position in which the center C1 of the stator core 161 and the center C2 of the rotor 151 are substantially aligned with each other and thus the restoring force R is 0 (zero), and mean that the center C1 of the stator core 161 and the center C2 of the rotor 151 are disposed at a position in which the center C1 of the rotor 151 and the center C2 of the rotor 151 are more closely disposed in comparison with that the center C1 of the stator core 161 and the center C2 of the rotor 151 are disposed at the first position.

Further, the center C1 of the stator core 161 is fixed and there is no change in position, and thus when the center C2 of the rotor 151 is arranged closer to the impeller 120 than the center C2 of the rotor 151 at the first position in the first direction Z, it may be defined that the center C1 of the stator core 161 and the center C2 of the rotor 151 are disposed at the second position.

Because the second position is a state after the stator core 161 and the rotor assembly 150 are assembled to the motor 100, the second position may be the position of the centers C1 and C2 of the stator core 161 and the rotor 151, respectively, in a substantial basic state of the motor 100.

When the center C1 of the stator core 161 and the center C2 of the rotor 151 are disposed at the second position, the center C2 of the rotor 151 may be moved to the center C1 of the stator core 161 by a length of a gap L1, which is between the center C2 of rotor 151 at the second position and the center C2 of the rotor 151 at the first position, by the restoring force R. That is, the center C2 of the rotor 151 may be moved by the length of the gap L1 in the first direction Z.

However, as described above, the center C2 of the rotor 151 may be moved in the direction of the center C1 of the stator core 161 by exactly the length of the gap L1, or the center C2 of the rotor 151 may be disposed adjacent to the center C1 of the stator core 161 as the center C2 of the rotor 151 is moved in the first direction Z by a distance, which is less than the length of the gap L1.

That is, when the center C1 of the stator core 161 and the center C2 of the rotor 151 are disposed at the second position, the center C2 of the rotor 151 and the center C1 of the stator core 161 may not be disposed at the same position in the first direction Z, but the center C2 of the rotor 151 and the center C1 of the stator core 161 may disposed closer to each other than when the center C2 of the rotor 151 and the center C1 of the stator core 161 are disposed at the first position.

This is because a maximum distance, in which the inner ring 221 is substantially moved in the direction of the impeller 120 by the clearance formed inside the bearing 200, may be less than the length of the gap L1 formed between the center C1 of the stator core 161 and the center C2 of the rotor 151.

Accordingly, when the clearance of the bearing 220 is smaller than the length of the gap L1, a distance in which the center C2 of the rotor 151 is moved in the first direction Z toward the center C1 of the stator core 161 may be less than the length of the gap L1.

Therefore, each of the centers C1 and C2 may be arranged to coincide at the second position, or the center C1 of the stator core 161 and the center C2 of the rotor 151 may not coincide with each other, but the center C1 of the stator core 161 and the center C2 of the rotor 151 may be arranged closer to each other than at the first position.

That is, the fact that the center C1 of the stator core 161 and the center C2 of the rotor 151 are disposed at the second position means that the center C2 of the rotor 151 is moved in the first direction Z by the length of the gap L1 or by a length less than the length of the gap L1.

As described above, a distance between the centers C1 and C2 when the center C1 of the stator core 161 and the center C2 of the rotor 151 are disposed at the second position may be less than a distance between the centers C1 and C2 when the center C1 of the stator core 161 and the center C2 of the rotor 151 are disposed at the first position.

Accordingly, a gap formed between the one end 221a of the inner ring 221 and the one end 223a of the outer ring 223 when the center C1 of the stator core 161 and the center C2 of the rotor 151 are disposed at the second position may be greater than a gap formed between the one end 221a of the inner ring 221 and the one end 223a of the outer ring 223 when the center C1 of the stator core 161 and the center C2 of the rotor 151 are disposed at the first position. Substantially, when the center C1 of the stator core 161 and the center C2 of the rotor 151 are disposed at the first position, the one end 221a of the inner ring 221 and the one end 223a of the outer ring 223 may be disposed at approximately the same position in the first direction Z, and when the center C1 of the stator core 161 and the center C2 of the rotor 151 are disposed at the second position, a predetermined gap may be generated between the one end 221a of the inner ring 221 and the one end 223a of the outer ring 223. Accordingly, as the predetermined gap is generated between the one end 221a of the inner ring 221 and the one end 223a of the outer ring 223, the clearance inside the bearing 220 may be reduced and the space, in which the ball 222 is moved, inside the bearing 220 may be reduced. Therefore, the noise may be reduced.

In FIGS. 6 and 7, it is assumed that when the center C1 of the stator core 161 and the center C2 of the rotor 151 are disposed at the second position, the centers C1 and C2 are disposed at approximately the same position.

Accordingly, the center C1 of the stator core 161 and the center C2 of the rotor 151 may come closer to each other, and the inner ring 221 of the bearing 220 may be moved in the first direction Z by interlocking with the rotor 151.

Therefore, as shown in FIG. 6, the gap L1 is generated between the one end 221a of the inner ring 221 and the one end 223a of the outer ring 223, and thus the clearance inside the bearing 220 may be reduced. Accordingly, as a moving distance of the ball 222 disposed between the inner ring 221 and the outer ring 223 is reduced inside the bearing 220, the noise of the generation may be reduced. Particularly, even when the motor 100 is not driven, the inner ring 221 may be spaced apart by the length of the gap L1, and thus the noise generated from the bearing 220 may be reduced.

As illustrated in FIG. 7, when the motor 100 is driven, the air may flow by the rotation of the impeller 120, and accordingly, thrust T may be generated in the rotor assembly 150 according to the flow of air and thus an external force may be further generated in the rotor assembly 150 in a direction in which the impeller 120 is disposed.

In the bearing 200, the inner ring 221 may be already moved in the first direction Z by the external force transmitted by the restoring force R, and the inner ring 221 may be moved by a maximum distance by the clearance formed inside the bearing 220. Therefore, even when an additional external force is generated, the inner ring 221 may no longer move in the first direction Z.

However, although not shown in the drawing, when the range of clearance formed inside the bearing 200 is large, the inner ring 221 may be additionally moved in the first direction Z by the thrust T. That is, when it is assumed that a distance, in which the center C2 of the rotor 151 is moved in the first direction Z when the center C1 of the stator core 161 and the center C2 of the rotor 151 are at the second position, is L1 (refer to FIG. 6), the center C2 of the rotor 151 may be moved in the first direction Z by a distance, which is greater than L1, when thrust T is generated.

At this time, as the center C2 of the rotor 151 is moved by a predetermined distance in the first direction Z by the restoring force R and the thrust T, the center C2 of the rotor 151 may be finally arranged closer to the impeller 120 than the center C1 of the stator core 161 with respect to the first direction Z.

However, this is limited to the case in which the range of clearance formed inside the bearing 220 is large as described above. Even when the thrust T is generated in the rotor assembly 150, the gap L1 between the one end 221a of the inner ring 221 and the one end 223a of the outer ring 223 may be the same as the gap L1 generated when the center C1 of the stator core 161 and the center C2 of the rotor 151 are at the second position.

As described above, in the motor 100 according to one embodiment of the present disclosure, the inner ring 223 may be moved in the first direction Z through the restoring force R, and the clearance inside the bearing 220 may be minimized. Accordingly, the noise that may be generated in the bearing 220 may be reduced.

As for the motor 100, the center C1 of the stator core 161 and the center C2 of the rotor 151 may be spaced apart from each other with respect to the first direction Z and thus the restoring force R may be generated. Accordingly, a preload may be generated in the bearing 220 without a washer, and thus the noise generated in the bearing 220 may be reduced.

When the motor 100 is not driven, the bearing 220 may be pressed by the restoring force R, and when the motor 100 is driven, the bearing 220 may be pressed by the restoring force R and the thrust T. Accordingly, it is possible to effectively reduce the noise generated in the bearing 220.

Hereinafter a motor 100 according to another embodiment of the present disclosure will be described. Configurations other than a stator 160', a rotor assembly 150', and a bearing 220' described below are the same as those of the motor 100 according to one embodiment of the present disclosure described above, and thus a description thereof will be omitted.

FIG. 8 is a cross-sectional view illustrating a state in which some components of a motor according to another embodiment of the present disclosure are assembled, FIG. 9 is a cross-sectional view illustrating a state after some components of the motor according to another embodiment of the present disclosure are assembled, and FIG. 10 is a cross-sectional view of some components of the motor according to another embodiment of the present disclosure when the motor is driven.

As shown in FIG. 8, a center C1 of a stator core 161' may be arranged further from the impeller 120 than a center C2 of a rotor 151' with respect to the first direction Z in an extension direction of a rotating shaft 152'.

Accordingly, a predetermined gap L1 may be generated between the center C1 of the stator core 161' and the center C2 of the rotor 151'. That is, the stator 160' and the rotor assembly 150' may be mounted to the motor 100 to allow the gap L1 to be formed between the center C1 of the stator core 161' and the center C2 of the rotor 151'.

A position, in which the stator core 161' and the rotor 151' are arranged to allow a predetermined gap L1 to be generated between the center C1 of the stator core 161' and the center C2 of the rotor 151', is defined as a first position. The first position is the same as the characteristics of the first position of the center C1 of the stator core 161 and the center C2 of the rotor 151 according to the above-mentioned embodiment of the present disclosure. Accordingly, a description thereof will be omitted.

The rotating shaft 152' may be arranged in the motor 110 to allow the gap L1 to be formed between the center C1 of the stator core 161' and the center C2 of the rotor 151'. Accordingly, an inner ring 221' of the bearing 220' may be in contact with the rotating shaft 152' that is disposed to allow the gap L1 to be formed between the center C1 of the stator core 161' and the center C2 of the rotor 151'.

In a state in which the stator 160' and the rotor assembly 150' are assembled to allow the gap L1 to be formed between the center C1 of the stator core 161' and the center C2 of the rotor 151', one end 221a' of the inner ring 221' and one end 223a' of an outer ring 223' of the bearing 220' may be arranged at substantially corresponding heights in a radial direction of the bearing 220'.

Accordingly, after the stator 160' and the rotor assembly 150' are assembled to the motor 100 to allow the gap L1 to be formed between the center C1 of the stator core 161' and the center C2 of the rotor 151', the rotor 151' may be moved in a direction opposite to the first direction Z.

As the center C2 of the rotor 151' is moved in the opposite direction to the first direction Z, the center C2 of the rotor 151' may be moved in the direction in which the center C1 of the stator core 161' is disposed.

At this time, a position, in which the center C1 of the stator core 161' and the center C2 of the rotor 151' are disposed, is defined as a second position. The second position is the same as the characteristics of the second position of the center C1 of the stator core 161 and the center C2 of the rotor 151 according to the above-mentioned embodiment of the present disclosure. Accordingly, a description thereof will be omitted. That is, when the center C1 of the stator core 161' and the center C2 of the rotor 151' are disposed at the second position, the centers C1 and C2 may be located at the same position in the first direction Z or the centers C1 and C2 may be located at a position in which the centers C1 and C2 are closer than a position when the centers C1 and C2 are located at the first position.

Hereinafter it is assumed that the centers C1 and C2 are disposed at the same position in the first direction Z when the center C1 of the stator core 161' and the center C2 of the rotor 151' are disposed at the second position. Further, in FIGS. 9 and 10, it is assumed that the centers C1 and C2 are disposed at approximately the same position when the center C1 of the stator core 161' and the center C2 of the rotor 151' are disposed at the second position.

The center C2 of the rotor 151' may be moved in the direction opposite to the first direction Z in which the center C1 of the stator core 161' is located. Accordingly, the center C2 of the rotor 151' and the center C1 of the stator core 160' may be arranged in the same line.

That is, a restoring force R may be transmitted to the rotor assembly 150' by a magnetic force generated between the stator core 161' and the rotor 151'. Accordingly, the rotor 151' and the rotating shaft 152' and the inner ring 221' coupled to the rotating shaft 152' may interlock with each other and be moved to the direction opposite to the first direction Z in which the impeller 120 is disposed.

As shown in FIG. 9, by the restoring force R, the center C2 of the rotor 151' may be moved by the distance of the gap L1 in the direction opposite to the direction in which the impeller 120 is disposed.

Accordingly, the center C1 of the stator core 161' and the center C2 of the rotor 151' may be arranged on the same line, and the inner ring 221' of the bearing 220' may interlock with the rotor 151' so as to be moved to the direction opposite to the first direction Z by the distance of the gap L1.

Therefore, the gap L1 may be generated between the other end 221b' of the inner ring 221' and the other end 223b' of the outer ring 223', and accordingly, the clearance inside the bearing 220' may be reduced. Accordingly, as a moving distance of a ball 222' disposed between the inner ring 221' and the outer ring 223' may be reduced inside the bearing 220', the noise of the generation may be reduced.

Particularly, even when the motor 100 is not driven, the inner ring 221' may be spaced apart by the length of the gap L1, and thus the noise generated from the bearing 220' may be reduced.

That is, as for the motor 100 according to one embodiment of the present disclosure described above, the center C2 of the rotor 151 may be arranged further from the impeller 120 than the center C1 of the stator core 161 with respect to the first direction Z. However, although the arrangement thereof is opposite, it is possible to reduce the noise generated in the bearing 220' by the restoring force R generated between the rotor 151' and the stator core 161'.

However, according to another embodiment of the present disclosure, the restoring force R may be formed in the opposite direction to the first direction Z and thus the inner ring 221' may be moved in the opposite direction to the first direction Z.

Additionally, as shown in FIG. 10, when the motor 100 is driven, the air may flow by the rotation of the impeller 120, and accordingly, thrust T may be generated in the rotor assembly 150 according to the flow of air and thus the rotor assembly 150 may be moved in the first direction Z in which the impeller 120 is disposed.

As the center C2 of the rotor 151' is moved in the first direction Z by the thrust T, the center C2 of the rotor 151' may be disposed away from the center C1 of the stator core 161'. At this time, a position, in which the center C1 of the stator core 161' and the center C2 of the rotor 151' are disposed, is defined as a third position.

The center C1 of the stator core 161' and the center C2 of the rotor 151' at the third position may be arranged to be further from each other than the state in which the center C1 of the stator core 161' and the center C2 of the rotor 151' at the second position The center C2 of the rotor 151' at the third position may be positioned closer to the impeller 120 than the center C1 of the stator core 161' by the thrust T, and thus a gap L3 may be formed between the center C2 of the rotor 151' and the center C1 of the stator core 161'.

That is, the center C2 of the rotor 151' may be moved from the first position toward the direction opposite to the first direction Z in which the impeller 120 is disposed, by the restoring force R, and then oppositely moved to the first direction Z, in which the impeller 120 is disposed, by the thrust T.

Accordingly, the rotor 151', the rotating shaft 152', and the inner ring 221' may interlock with each other and be moved in the opposite direction to the first direction Z by the restoring force R, and when the motor 100 is driven, the rotor 151', the rotating shaft 152', and the inner ring 221' may be moved to the first direction Z.

The inner ring 221' may be moved to the opposite direction to the first direction Z by the distance of the gap L1, which is between the center C2 of the rotor 151' and the center C1 of the stator core 161' and generated at the installation, by the restoring force R, and then the inner ring 221' may be moved to the first direction Z by the distance of the gap L3, which is generated between the center C2 of the rotor 151' and the center C1 of the stator core 161', by the thrust T.

When the center C1 of the stator core 161' and the center C2 of the rotor 151' are substantially disposed at the third position, as well as the thrust T, an external force may be additionally transferred to the center C2 of the rotor 151' to the opposite direction of the thrust T by a magnetic restoring force R between the centers C1 and C2 as the center C2 of the rotor 151' and the center C1 of the stator core 161' are spaced apart.

Accordingly, while a thrust T1 is applied to the rotor 151' in the first direction Z, which is a direction in which the center C2 of the rotor 151' is away from the center C1 of the stator core 161', the restoring force R may be applied to the rotor 151' in the opposite direction to the first direction Z, which is the direction in which the center C2 of the rotor 151' is adjacent to the center C1 of the stator core 161'. That is, the gap L3 formed between the center C1 of the stator core 161' and the center C2 of the rotor 151' at the third position may be a distance, in which the center C2 of the rotor 151' is finally moved from the center C1 of the stator core 161', by a value of the vector sum of the external force of the thrust T and the restoring force R.

It is assumed that, when the center C1 of the stator core 161' and the center C2 of the rotor 151' are disposed at the third position, a force applied to the rotor 151' by the thrust T is greater than a force applied to the rotor 151' by the restoring force R. Accordingly, the center C2 of the rotor 151' may be moved to the first direction Z and thus when the center C1 of the stator core 161' and the center C2 of the rotor 151' are disposed at the third position, the gap L3 may be formed between the centers C1 and C2.

Although not shown in the drawing, even when the motor 100 is driven in a state in which the force applied to the rotor 151' by the thrust T is less than the force applied to the rotor 151' by the restoring force R, the center C2 of 151' may be not moved in the first direction Z, and thus each of the centers C1 and C2 may maintain the second position.

Accordingly, the gaps L1 and L3 may be formed between the one end 221a' of the inner ring 221' and the one end 223a' of the outer ring 223' before or after the motor 100 is driven. That is, before the motor 100 is driven, the one end 221a' of the inner ring 221' may be moved to the opposite direction to the first direction Z relative to the one end 223a' of the outer ring 223', by the restoring force R, and thus the gap L1 may be formed between the one end 221a' of the inner ring 221' and the one end 223a' of the outer ring 223'. When the motor 100 is driven, the one end 221a' of the inner ring 221' may be moved to the first direction Z relative to the one end 223a' of the outer ring 223', by the thrust T, and thus the gap L3 may be formed between the one end 221a' of the inner ring 221' and the one end 223a' of the outer ring 223'.

Therefore, the gaps L1 and L3 may be formed between the one end 221a' of the inner ring 221' and the one end 223a' of the outer ring 223', and thus the clearance inside the bearing 220' may be reduced. Accordingly, as the moving distance of the ball 222' disposed between the inner ring 221' and the outer ring 223' inside the bearing 220' is reduced, the noise may be reduced.

Hereinafter a motor 100 according to another embodiment of the present disclosure will be described. Configurations other than a first bearing 210' described below are the same as those of the motor 100 according to one embodiment of the present disclosure described above, and thus a description thereof will be omitted.

FIG. 11 is a cross-sectional view illustrating a state after some components of a motor according to another embodiment of the present disclosure are assembled.

As shown in FIG. 11, the first bearing 210' and the second bearing 220 according to another embodiment of the present disclosure are different from the first bearing 210 and the second bearing 220 according to the above-described embodiment. Particularly, the first bearing 210' and the second bearing 220 may be arranged in different shapes.

That is, when the center C1 of the stator center 161 and the center C2 of the rotor 151 are disposed at the second position, the inner ring 211 and the outer ring 213 of the first bearing 210 may be installed to the frames 140 and 170 so as to be disposed at positions corresponding to the inner ring 221 and the outer ring 223 of the second bearing 220 according to one embodiment of the present disclosure.

However, when the center C1 of the stator center 161 and the center C2 of the rotor 151 are disposed at the second position, an inner ring 211' and an outer ring 213' of the first bearing 210' according to another embodiment of the present disclosure may be arranged in a shape different from the inner ring 221 and the outer ring 223 of the second bearing 220.

Particularly, when the center C1 of the stator core 161 and the center C2 of the rotor 151 are disposed at the second position, one end 211a' of the inner ring 211' and one end 213a' of the outer ring 213' of the first bearing 210' may be provided to be disposed at substantially the same position with respect to the first direction Z. At this time, the one end 211a of the inner ring 211 and the one end 213a of the outer ring 213 of the second bearing 220 may be spaced part from each other so as to have the gap L1 in the first direction Z, which is the same as the second bearing 220 according to the above-mentioned embodiment.

That is, in the motor 100 according to another embodiment of the present disclosure, when the center C1 of the stator center 161 and the center C2 of the rotor 151 are disposed at the second position, the first bearing 210' may be assembled to the upper frame 140 to allow the one end 211a' of the inner ring 211' and the one end 213a' of the outer ring 213' of the first bearing 210' to be disposed at substantially the same position with respect to the first direction Z, and the second bearing 220 may be assembled to the lower frame 170 to allow the one end 211a of the inner ring 211 and the one end 213a of the outer ring 213 of the second bearing 220 to be spaced part from each other with respect to the first direction Z.

Accordingly, a larger clearance than the second bearing 220 may be secured in the first bearing 210'. The clearance inside the first bearing 210' is secured to a predetermined size, and thus even when an external force is transmitted, the rigidity against the external force may be improved according to the movement of the first bearing 210' according to the clearance.

When the motor 100 is driven, an external force in a radial direction of the impeller 120 may be transmitted to a position adjacent to the impeller 120 according to rotation of the impeller 120. The first bearing 210' may be a component adjacent to the impeller 120, and thus when the motor 100 is driven, an external force may be transmitted in the radial direction of the first bearing 210' by the impeller 120.

Accordingly, an additional external force may be generated in the first bearing 210', which may cause a reliability difficulty. However, in the case of the first bearing 210' according to another embodiment of the present disclosure, when the center C1 of the stator center 161 and the center C2 of the rotor 151 are disposed at the second position, the inner ring 211' and the outer ring 213' of the first bearing 210' may be approximately the same line with respect to the radial direction of the first bearing 210', and thus a preload applied to the first bearing 210' may be minimized.

Therefore, even when an additional external force is generated on the first bearing 210', the preload applied to the first bearing 210' may be minimized and thus the rigidity against the additional external force may be increased and the reliability of the first bearing 210' may be improved.

While the present disclosure has been particularly described with reference to exemplary embodiments, it should be understood by those of skilled in the art that various changes in form and details may be made without departing from the spirit and scope of the present disclosure.

What is claimed is:

1. A motor comprising:
a stator including a stator core;
a rotating shaft inside the stator;
a rotor inside the stator and including the rotating shaft, the rotor configured to electromagnetically interact with the stator to rotate the rotating shaft;
a housing in which the stator and the rotor are accommodated; and
a bearing coupled to the housing and configured to support rotation of the rotating shaft while the stator and the rotor are stably accommodated in the housing, the bearing including:
an outer ring coupled to the housing,
an inner ring interlocked with the rotating shaft so as to move with a movement of the rotor, and
a ball between the inner ring and the outer ring,
wherein the stator, the rotor, and the bearing are configured so that,
with a movement of the rotor in an axial direction of the rotating shaft,
the inner ring and the rotating shaft move together in the axial direction to form a gap in the axial direction between the outer ring and the inner ring, and
a center of the rotor along the axial direction moves relative to a center of the stator core along the axial direction, and
with a movement of the rotor in a direction in which the center of the rotor along the axial direction becomes closer to the center of the stator core along the axial direction,
a length of the gap increases.

2. The motor of claim 1, further comprising:
an impeller coupled to the rotating shaft at an upper side of the housing, and configured to rotate with rotation of the rotating shaft to generate a flow of air,
wherein the center of the stator core along the axial direction is closer to the impeller than the center of the rotor along the axial direction.

3. The motor of claim 2, wherein
the rotor and the stator are configured so that, a magnetic interaction between the rotor and the stator causes the rotor to move by a predetermined distance in a direction of the impeller.

4. The motor of claim 3, wherein
with the movement of the rotor in the axial direction of the rotating shaft,
the inner ring is moved closer to the impeller than the outer ring to form the gap.

5. The motor of claim 1, further comprising:
an impeller coupled to the rotating shaft at an upper side of the housing, and configured to rotate with rotation of the rotating shaft to generate a flow of air,
wherein the center of the stator core along the axial direction is further from the impeller than the center of the rotor along the axial direction.

6. The motor of claim 5, wherein
the rotor and the stator are configured so that, a magnetic interaction between the rotor and the stator causes the rotor to move by a predetermined distance in a direction opposite to a direction of the impeller.

7. The motor of claim 6, wherein
with the movement of the rotor in the axial direction of the rotating shaft,
the inner ring is moved farther away from the impeller than the outer ring to form the gap.

8. The motor of claim 6, wherein
with the rotor moved by the predetermined distance in the direction opposite to the direction of the impeller, the center of the stator core and the center of the rotor are at a same position with respect to the axial direction.

9. The motor of claim 8, wherein
in response to the motor being driven, the rotor rotates the rotating shaft and the impeller to generate the flow of air and the rotor is moved more than the predetermined distance in the direction of the impeller by the flow of air so that the center of the stator core is closer to the impeller in the axial direction than the center of the rotor.

10. The motor of claim 1, wherein
the rotor includes a permanent magnet.

11. The motor of claim 1, wherein
the bearing includes:
a first bearing coupled to an upper side of the rotating shaft, and
a second bearing coupled to a lower side of the rotating shaft, and
a diameter ratio corresponding to a diameter of the first bearing divided by a diameter of the second bearing is 1.1 to 1.6.

12. A motor comprising:
a stator including a stator core;
a rotating shaft inside the stator;
a rotor inside the stator and including the rotating shaft, the rotor configured to electromagnetically interact with the stator to rotate the rotating shaft;
a housing in which the stator and the rotor are accommodated;

an impeller coupled to the rotating shaft at an upper side of the housing, and configured to rotate with rotation of the rotating shaft to generate a flow of air;

a bearing coupled to the housing and configured to support rotation of the rotating shaft while the stator and the rotor are stably accommodated in the housing, wherein a center of the stator core along an axial direction of the rotating shaft is closer to the impeller than the center of the rotor along the axial direction, the rotor and the stator are configured so that, a magnetic interaction between the rotor and the stator causes the rotor to move by a predetermined distance in a direction of the impeller, and the stator, the rotor, and the bearing are configured so that with the rotor moved by the predetermined distance in the direction of the impeller, the center of the stator core and the center of the rotor are at a same position with respect to the axial direction.

13. The motor of claim 12, wherein in response to the motor being driven, the rotor rotates the rotating shaft and the impeller to generate the flow of air and the rotor is moved more than the predetermined distance in the direction of the impeller by the flow of air.

14. A motor comprising:

a stator including a stator core;

a rotating shaft inside the stator;

a rotor inside the stator and including the rotating shaft, the rotor configured to electromagnetically interact with the stator to rotate the rotating shaft;

a housing in which the stator and the rotor are accommodated; and a bearing coupled to the housing and configured to support rotation of the rotating shaft while the stator and the rotor are stably accommodated in the housing, the bearing including:

a first bearing coupled to an upper side of the rotating shaft and including:

a first outer ring coupled to the housing, a first inner ring interlocked with the rotating shaft so as to move with a movement of the rotor, and a ball between the first inner ring and the first outer ring, and a second bearing coupled to a lower side of the rotating shaft and including:

a second outer ring coupled to the housing, a second inner ring interlocked with the rotating shaft so as to move with a movement of the rotor, and a ball between the second inner ring and the second outer ring, wherein the stator, the rotor, the first bearing, and the second bearing are configured so that, with a movement of the rotor in an axial direction of the rotating shaft, the first inner ring, second inner ring, and the rotating shaft move together in the axial direction to form a first gap in the axial direction between the first outer ring and the first inner ring and a second gap in the axial direction between the second outer ring and the second inner ring.

* * * * *